US008501223B2

(12) United States Patent
Wedekind et al.

(10) Patent No.: US 8,501,223 B2
(45) Date of Patent: *Aug. 6, 2013

(54) METHODS FOR DIETARY MANAGEMENT OF CATS TO AVOID HYPERTHYROIDISM

(75) Inventors: Karen J. Wedekind, Meriden, KS (US); Claudia A. Kirk, Knoxville, TN (US)

(73) Assignee: Hill's Pet Nutrition, Inc., Topeka, KS (US)

(*) Notice: Subject to any disclaimer, the term of this patent is extended or adjusted under 35 U.S.C. 154(b) by 993 days.

This patent is subject to a terminal disclaimer.

(21) Appl. No.: 10/871,990

(22) Filed: Jun. 18, 2004

(65) Prior Publication Data

US 2005/0064016 A1  Mar. 24, 2005

Related U.S. Application Data

(60) Provisional application No. 60/608,924, filed on Jun. 20, 2003.

(51) Int. Cl.
*A23K 1/17* (2006.01)
(52) U.S. Cl.
USPC .......................... 424/442; 514/561
(58) Field of Classification Search
None
See application file for complete search history.

(56) References Cited

U.S. PATENT DOCUMENTS

| | | | |
|---|---|---|---|
| 5,017,389 A | 5/1991 | Green | |
| 5,084,482 A | 1/1992 | Hirsch et al. | |
| 5,484,623 A * | 1/1996 | McLean | 426/601 |
| 5,885,592 A | 3/1999 | Duan et al. | |
| 6,046,308 A | 4/2000 | Glücksmann | |
| 6,071,415 A | 6/2000 | Frommer et al. | |
| 6,245,364 B1 * | 6/2001 | Jones et al. | 426/2 |
| 2003/0077254 A1 * | 4/2003 | Ramaekers | 424/93.3 |
| 2004/0081743 A1 * | 4/2004 | Laflamme et al. | 426/630 |
| 2005/0058691 A1 | 3/2005 | Wedekind et al. | |
| 2005/0064016 A1 | 3/2005 | Wedekind et al. | |
| 2005/0171104 A1 | 8/2005 | Rahimi-Ghadim et al. | |
| 2009/0226540 A1 | 9/2009 | Wedekind et al. | |
| 2009/0269416 A1 | 10/2009 | Wedekind et al. | |
| 2009/0275505 A1 | 11/2009 | Wedekind | |
| 2010/0068304 A1 | 3/2010 | Wedekind et al. | |
| 2010/0068306 A1 | 3/2010 | Wedekind et al. | |

FOREIGN PATENT DOCUMENTS

| | | | |
|---|---|---|---|
| JP | H07-502518 | 3/1995 | |
| WO | WO 96/03154 | 2/1996 | |
| WO | WO 97/11703 | 4/1997 | |
| WO | WO 01/17364 | * 3/2001 | |
| WO | WO 03/022292 | 3/2003 | |
| WO | WO 03/039562 | 5/2003 | |
| WO | WO 03/084915 | 10/2003 | |
| WO | WO 2004/112498 | 12/2004 | |
| WO | WO 2004/112499 | 12/2004 | |
| WO | WO 2007/084986 | 7/2007 | |
| WO | WO 2007/087623 | 8/2007 | |
| WO | WO 2007/133726 | 11/2007 | |
| WO | WO 2008/005980 | 1/2008 | |

OTHER PUBLICATIONS

WO 01/017364, Mar. 15, 2001 EFFEM Food Pty Ltd.*
(Pathologic Basis of disease by Robbins, Cotran and Kumar, third edition, pp. 1203-1204).*
Dietary Iodine Level and Thyroid Function in the Cat, Michael F. Tarttelin et al. American Institute of Nutrition. J. Nutr. 124:2477S-2578S, 1994.*
Michael et al. (Dietary Iodine Level and Thyroid Function in Cat: American Institute of nutrition. J. Nutr. 124: 2577S-2578S, 1994).*
Anonymous, "Royal Canin Veterinary Diet", Internet article cited in PCT/US2004/019853 as being retrieved from the internet on Oct. 15, 2004 (XP002301316); http://www.walthamusa.com/Learning%20Center/pf/LP21.pdf, pp. 6-8.
Anonymous, "Sodium selenate", Life Link, Internet article cited in PCT/US2004/019853 as being retrieved from the internet on Oct. 13, 2004 (XP002301317); http://www.lifelinknet.com/siteResources/ProductPages/Sodium-Selenate.asp.
Association of American Feed Control Officials (AAFCO), "AAFCO Cat Food Nutrient Profiles Based on Dry Matter," Official Publication, pp. 132-133 (2002).
Association of American Feed Control Officials (AAFCO), "AAFCO Cat Food Nutrient Profiled Based on Dry matter," Official Publication, pp. 134-135 (2004).
Brewer, "Nutrition of the cat", J. Am. Vet. Med. Assoc., 180(10):1179-1182 (1982).
Brown et al., "Thyroid Growth Immunoglobulins in Feline Hyperthyroidism", Thyroid, 2(2):125-130 (1992).
Buffington, "Nutritional Requirements and Feeding Recommendations", The Cat: Diseases and Clinical Management 2nd Ed., pp. 133-151 (1994).
Court et al., "Identification and concentration of soy isoflavones in commercial cat foods", Am. J. Vet. Res., 63(2): 181-185 (2002).
Divi et al., "Anti-Thyroid Isoflavones from Soybean—Isolation, Characterization, and Mechanisms of Action", Biochemical Pharmacology, 54:1087-1096 (1997).
Doerge et al., "Goitrogenic and Estrogenic Activity of Soy Isoflavones", Environmental Health Perspectives, 110(3):349-353 (Jun. 2002).
Edinboro et al., "Epidemiologic study of relationships between consumption of commercial canned food and risk of hyperthyroidism in cats", JAVMA, 224(6):879-886 (Mar. 2004).
Ferguson, "Update on Diagnosis of Canine Hypothyroidism", Vet. Clin. N. Am. Small Anim. Pract., 24(3):515-539 (1994).

(Continued)

*Primary Examiner* — Brian Gulledge
*Assistant Examiner* — Snigdha Maewall

(57) ABSTRACT

Dietary compositions and methods for reducing risk of developing hyperthyroidism in a feline are disclosed. The compositions and methods restrict the amount of selenium intake or restrict the amount of selenium and iodine intake in the feline.

10 Claims, No Drawings

OTHER PUBLICATIONS

Foster et al., "Selenium status of cats in four regions of the world and comparison with reported incidence of hyperthyroidism in cats in those regions", Am. J. Vet. Res., 62(6):934-937 (Jun. 2001).

Fradkin et al., "Iodine-induced Thyrotoxicosis", Medicine 62(1): 1-20 (1983).

Gerber et al., "Etiopathology of Feline Toxic Nodular Goiter", Vet. Clin. N. Am. Small Anim. Pract. Thyroid Disorders, 24(3): 541-565 (May 1994).

Holzworth et al., "Hyperthyroidism in the Cat: Ten cases", J. Am. Vet. Med. Assoc., 176(4): 345-353 (Feb. 1980).

International Search Report PCT/US2004/019852; PCT Search Authority.

International Search Report PCT/US2004/019853; PCT Search Authority.

Johnson et al., "Iodine content of commercially-prepared cat foods", NZ Vet. J., 40:18-20 (1992).

Kass et al., "Evaluation of Environmental, Nutritional, and Host Factors in Cats with Hyperthyroidism", J. Vet. Intern. Med., 13:323-329 (1999).

Kyle et al., "Serum free thyroxine levels in cats maintained on diets relatively high or low in iodine", NZ Vet. J., 42:101-103 (1994).

Labuc et al., "Feline Hyperthyroidism—A Short Review", Aust. Vet Practit. 16(3):139-142 (Sep. 1986).

Laurberg et al., "Environmental Iodine Intake Affects the Type of Nonmalignant Thyroid Disease", Thyroid, 11:457-469 (Nov. 2001).

Laurberg et al., "High incidence of multinodular toxic goiter in the elderly population in low iodine intake area vs. high incidence of Graves' disease in the young in a high iodine intake area: comparative surveys of thyrotoxicosis epidemiology in East-Jutland Denmark and Iceland", J Internal Med., 229:415-420 (1991).

Martin et al., "Evaluation of dietary and environmental risk factors for hyperthyroidism in cats", J. Am. Vet. Med. Assoc., 217(6):853-856 (Sep. 2000).

Martins et al., "Natural course of iodine-induced thyrotoxicosis (Jodbasedow) in endemic goiter area: A 5 year follow-up", J. Endocrin. Invest., 12:239-244 (1989).

Mason et al., "Determination of Iodine in Urine, Using Epithermal Instrumental Neutron Activation Analysis (EINAA), at the University of Missouri Research Reactor (MURR)", J. Radioanalytical Nucl. Chem., 195(1):57-65 (1995).

Mumma et al., "Toxic and protective constituents in pet foods", Am. J. Vet. Res., 47(7):1633-1637 (Jul. 1986).

National Research Council, "Number 13:Nutrient Requirement of Cats Revised 1978", National Academy of Sciences, pp. 10, 18-21; 25-27 (1978).

Nichols et al., "Longitudinal study of iodine in market milk and infant formula via epiboron neutron activation analysis", J. Radioanalytical Nucl. Chem., 236(1-2):65-69 (1998).

Pennington, "A review of iodine toxicity reports", J. Am. Dietetic Assoc., 90(11):1571-1581 (1990).

Peterson et al., "Spontaneous Feline Hyperthyroidism" (Abstract), Program of the 62nd Annual Meeting of the Endocrine Society, No. 516, 203 (1980).

Peterson et al., "Spontaneous Hyperthyroidism in the Cat" (Abstract), Proceedings of the American College of Veterinary Internal Medicine, 108 (Jul. 1979).

Peterson, "Propylthiouracil in the Treatment of Feline Hyperthyroidism", J. Am. Vet. Med. Assoc., 179:485-487 (Sep. 1981).

Ranz et al., "Estimation of Iodine Status in Cats", Waltham International Symposium: Pet Nutrition Coming of Age ; 2002 American Society for Nutritional Science. J. Nutr. 132: 1751S-1753S, (2002).

Scarlett et al., "Feline Hyperthyroidism: A Descriptive and Case-Control Study", Preventive Vet. Med., 6:295-309 (1988).

Schrauzer, "Selenomethionine: A Review of its Nutritional Significance, Metabolism and Toxicity", J. Nutr., 130:1653-1656 (2000).

Simcock et al., "The role of selenium in companion animal health and nutrition", Institute of Food, Nutrition and Human Health, Massey University, Palmerton North, New Zealand, pp. 511-520.

Smith, "Changes and challenges in feline nutrition", J. Am. Vet. Med. Assoc., 203(10):1395-1400 (Nov. 1993).

Son et al., "Lack of Effect of Soy Isoflavone on Thyroid Hperplasia in Rats Receiving an Iodine-deficient Diet", Jpn. J. Cancer Res. 92:103-108 (Feb. 2001).

Tarttelin et al., "Dietary Iodine Level and Thyroid Function in the Cat", Am. Inst. Nutr. J. Nutr., 124:2577S-2578S (1994).

Tarttelin et al., "Serum free thyroxine levels respond inversely to changes in level of dietary iodine in the domestic cat", NZ Vet. J., 40:66-68 (1992).

Trepanier et al., "Efficacy and safety of once versus twice daily administration of methimazole in cats with hyperthyroidism", J. Am Vet. Med. Assoc., 222(7):954-958 (Apr. 2003).

Wedekind et al, "Defining the Safe Lower and Upper Limit for Selenium (Se) in Adult Dogs" (Abstract), Annual Meeting of Professional Research Scientists on Experimental Biology, New Orleans, Louisiana, USA (Apr. 20-24, 2002).

Wedekind et al., "Current AAFCO and NRC Recommendations for Selenium (Se) Are Too Low for Kittens" (Abstract), FASEBJ 14(4):A295 (2000).

Wedekind et al., "Effect of Varying Selenium (Se) Intake on Thyroid Hormone Metabolism in Dogs" (Abstract), FASEBJ 15(5):A953 (2001).

Wedekind et al., "Bioavailability of Selenium in Petfood Ingredients" (Abstract), Annual Meeting of Professional Research Scientists on Experimental Biology, New Orleans, Louisiana, USA (Apr. 6-9, 1997).

Wedekind et al., "Determination of the selenium requirement in kittens", J. Anim. Physiol. Anim. Nutr., 87:315-323 (2003).

Wedekind et al., "Selenium in Pet Foods—Is Bioavailability an Issue?", Proceedings, Purina Nutrition Forum: Supplement to Compendium on Continuing Education for the practicing Veterinarian, 22(9A):17-22 (Sep. 2000).

Wedekind, "The selenium requirement of the puppy", J. Anim. Physiol Anim Nutr., 88:1-8 (2004).

Yang et al., "Endemic selenium intoxication of humans in China", Am. J. Clin. Nutr., 37(5):872-881 (May 1983).

Yang et al., "Studies of Safe Maximal Daily Dietary Se-Intake in a Seleniferous Area in China. Part II. Relation Between Se-Intake and the Manifestation of Clinical Signs and Certain Biochemical Alterations in Blood and Urine", J. Trace Elem. Electrolytes Health Dis., 3(3):123-130 (1989).

Levander, O.A., Selenium. In: Trace Elements in Human and Animal Nutrition, Mertz, W. ed. Orlando, FL: Academic Press Inc., pp. 209-279.

McDowell, L.R., Iodine. In: Minerals in Animal and Human Nutrition, San Diego: Academic Press, pp. 224-245, 1992.

Peterson et al., 1994, "The cat: diseases and clinical management," R.G. Sherding, ed., New York, Churchill Livingstone, 2nd Ed., pp. 1416-1452.

Spate et al., "Determination of Iodine in Human Nails Via Epithermal Neutron Activation Analysis", J. Radioanalytical and Nuclear Chemistry, Articles, vol. 195, No. 1, pp. 21-30 (1995).

Behrend, 1999, "Medical Therapy of Feline Hyperthyroidism," Compendium on Continuing Education for the Practicing Veterinarian 21(3):234-244.

Fox et al., 1999, "Electrocardiographic and Radiographic Changes in Cats with Hyperthyroidism: Comparison of Population Evaluated During 1992-1993 vs. 1979-1982," J. Anim. Hosp. Assoc. 35(1):27-31.

Peterson et al., 1983, "Feline Hyperthyroidism: Pretreatment Clinical and Laboratory Evaluation of 131 Cases," J. Amer. Vet. Med. Assoc. 183(1):103-110.

Robbins et al., *Pathologic Basis of Disease*, 3rd ed., pp. 1203-1204, 1984.

Slater et al., 2001, "Long-Term Health and Predictors of Survival for Hyperthyroid Cats Treated with Iodine 131," J. Vet. Intern. Med. 15(1):47-51.

Trepanier et al., 2006, "Medical Management of Hyperthyroidism," Clinical Techniques in Small Animal Practice 21(1):22-28.

Yu et al., 2002, "A Low-Selenium Diet Increases Thyroxine and Decreases 3,5,3' Triiodothyronine in the Plasma of Kittens," J. Anim. Physiol. a. Anim. Nutr. 86:36-41.

Bruyette, 2004, "The Options for Treating Feline Hyperthyroidism," Vet. Med.

Committee on Animal Nutrition, National Research Council, 1986, "Nutrient Requirements of Cats," Revised Edition, The National Acadamies Press, p. 18.

Dibartola et al., 1996, "Effect of Treatment of Hyperthyroidism on Renal Function in Cats," J. Amer. Vet. Med. Assoc. 208(6):875-878.

Graves et al., 1994, "Changes in Renal Function Associated with Treatment of Hyperthyroidism in Cats," Amer. J. Vet. Res. 55(12):1745-1749.

Hand et al., eds., 2000, "Disorders of the Thyroid Gland," Small Animal Clinical Nutrition, Walsworth Publishing Co., Marceline, MO 4th ed., pp. 127-146 and 863-868.

Hoffmann et al., 2003, "Transdermal Methimazole Treatment in Cats with Hyperthyroidism," J. Feline Med. Surg. 5(2):77-82.

Holzworth et al., 1980, "Hyperthyroidism in the Cat: Ten Cases," J. Amer. Vet. Med. Assoc. 176(4):345-353.

International Search Report and Written Opinion in International Application No. PCT/US07/072738, mailed Nov. 20, 2007.

International Search Report in International Application No. PCT/US07/011512, mailed Oct. 19, 2007.

International Search Report in International Application No. PCT/US07/061100, mailed Nov. 6, 2007.

Ishizawa, 2000, "Hyperthyroidism (Graves Disease)," JIM 10(4):296-299.

Kobayashi et al., 1990, "Hypertension in Cats with Chronic Renal Failure or Hyperthyroidism," 4(2):58-62, Abstract.

Liu et al., 1984, "Hypertropic Cardiomyopathy and Hyperthyroidism in the Cat," J. American Veterinary Medical Assoc. 185(1):52-57, Abstract.

Nakazawa, 1994, "Hyperthyroidism and the Heart," Japan Med. J. 3680:130-131.

Panchenkova et al., 2000, "Thyroid Status and Cariovascular System (Review of Literature)" No. 1 http://www.rusmedserv.com/thyronet/th.spec/thyr-2-4.htm.

Peterson et al., 1993, "Comparison of the Disposition of Carbimazole and Methimazole in Clinically Normal Cats," Res. Vet. Sci. 54(3):351-355.

Simcock et al., 2010, "Selenium Content of Commercial Pet Foods," Proc. Nutr. Soc. Of NZ website.

Yamaoki, 2004, "Dealing with Thyroid Disease," Magazine of Japan Med. Assoc. 132(8):5310-S312.

Brown et al., 1998, "Interventional Nutrition for Renal Disease," Clinical Techniques in Small Animal Practice 13(4):217-223.

\* cited by examiner

)# METHODS FOR DIETARY MANAGEMENT OF CATS TO AVOID HYPERTHYROIDISM

CROSS REFERENCE TO RELATED APPLICATIONS

This application claims priority to U.S. Provisional Application No. 60/608,924, filed Jun. 20, 2003, which is incorporated in its entirety by reference.

FIELD

This application relates generally to dietary maintenance of the healthy feline and, more particularly, to methods for reducing risk of developing hyperthyroidism in a feline by restricting the amount of selenium intake in the feline.

BACKGROUND

Hyperthyroidism is the most common endocrine disease of older cats. The disease is accompanied by hyperactivity, weight loss and a palpable goiter. Although treatments are available, including anti-thyroid drugs, surgery or the use of radioactive iodine to destroy the glandular tissue, each of these interventions has limitations and side effects. Thus, an unfilled need exists for methods and compositions for reducing the risk of developing abnormal thyroid function and hyperthyroidism in cats.

SUMMARY

Accordingly, the inventors herein have succeeded in discovering that restricting the dietary intake of selenium in cats reduces the risk of the cats developing hyperthyroidism.

Thus, in various embodiments, the present invention can involve a method for reducing risk of developing hyperthyroidism in a feline. The method can comprise restricting the amount of selenium in the feline diet to an amount equal to or less than about 1.3 mg/kg, equal to or less than about 1.0, equal to or less than about 0.8 mg/kg, or equal to or less than about 0.65 mg/kg on a dry matter basis. The methods can further comprise restricting the amount of iodine in the feline diet to not more than about 1.0 mg/kg on a dry matter basis.

The present invention can also include, in various embodiments, a reduced-selenium and reduced-iodine packaged feline diet composition. The composition can comprise selenium in an amount of equal to or less than about 2.5 mg/kg on a dry matter basis, equal to or less than about 2.0 mg/kg on a dry matter basis, equal to or less than about 1.0 mg/kg or equal to or less than about 0.65 on a dry matter basis and iodine in an amount of equal to or less than about 1.0 mg/kg on a dry matter basis.

In various embodiments, the compositions and methods based upon the compositions can involve dietary compositions comprising from about 10% to about 40% or from about 20% to about 40% protein on a dry matter basis. The protein in such compositions can contain selenium at a concentration equal or less than about 1.0 mg/kg or equal to or less than about 0.5 mg/kg crude protein.

In various embodiments, the composition and methods based upon the compositions can involve dietary compositions comprising from 10% to about 50% protein, from about 10 to about 30% fat and from about 5% to about 55% carbohydrate.

The protein in the compositions and methods based upon the compositions can be vegetable protein or animal protein or combinations thereof. The vegetable protein can be potato concentrate, soy concentrate, soy protein isolate, soybean meal, rice isolate, corn gluten meal or combinations thereof and the animal protein can be from chicken backs, beef tongue, pork lung, beef lung, mechanically deboned turkey, poultry by-product meal, egg and combinations thereof.

DETAILED DESCRIPTION

The present invention, thus, involves diets containing a restricted amount of selenium or a restricted amount of both selenium and iodine and methods of feeding such diets to felines to reduce the risk of developing hyperthyroidism.

Hyperthyroidism in cats can be diagnosed and assessed as to severity according to methods and disease characteristics well known in the art. (see, for example, Peterson et al., in *The cat: diseases and clinical management*, R. G. Sherding, Ed., New York, Churchill Livingstone, $2^{nd}$ Edition, pp. 1416-1452, 1994; Gerber et al. *Vet Clin North Am Small Anim Pract* 24:541-65, 1994).

The term "iodine," as used herein, refers to the iodine atom without reference to its molecular form. Thus, the term iodine includes without restriction the atom iodine, which can be present in one or more chemical forms, such as iodide, iodate, periodate, erythrosine, and the like.

The term "selenium," as used herein, refers to the selenium atom without reference to its molecular form. Thus, the term selenium includes without restriction the atom selenium which can be present in one or more chemical forms, such as selenite, selenate, selenomethionine, and the like.

The abbreviation "T4," as used herein, refers to the iodine-containing amino acid thyroxine, 3,5,3',5'-tetraiodothyronine. The term "free T4" refers to T4 that is not bound to a carrier protein such as thyroid-binding globulin, albumin, prealbumin, and the like.

The abbreviation "T3," as used herein, refers to the iodine-containing amino acid 3,5,3'-triiodothyronine. The term "free T3" refers to T3 that is not bound to a carrier protein such as thyroid-binding globulin, albumin, prealbumin, and the like.

The abbreviation "GPX," as used herein, refers to the selenium-dependent enzyme glutathione peroxidase.

Concentration of iodine or other mineral elements in foods and feedstuffs can be expressed alternatively on a molar basis (micromoles per kilogram) or on a weight basis (milligrams per kilogram, identical to parts per million, "PPM"). Iodine has a molecular weight of 126.9. Thus a molar concentration of 2.76 micromoles of iodine per kilogram is equal to a weight concentration of 0.35 PPM. Selenium has a molecular weight of 78.96. Thus a molar concentration of 1.25 micromole of selenium per kilogram is equal to a weight concentration of 0.1 mg/kg.

In various embodiments of the present invention, selenium can be present in the diet composition at a maximum concentration equal to or less than about 1.3 mg/kg of diet, a maximum concentration equal to or less than about 1.0 mg/kg of diet, a maximum concentration equal to or less than about 0.9 mg/kg of diet, a maximum concentration equal to or less than about 0.8 mg/kg of diet, a maximum concentration equal to or less than about 0.65 or 0.60 mg/kg of diet, a maximum concentration equal to or less than about 0.4 mg/kg, a maximum concentration equal to or less than about 0.3 mg/kg of diet or a maximum concentration equal to or less than about 0.2 mg/kg of diet on a dry matter basis.

In various embodiments iodine can additional be present in the diet compositions. The amount of iodine present should be at a level that does not cause adverse thyroid function. It is believed that such maximum level that does not cause adverse thyroid function in cats is about 2.5 or about 2.0 mg/kg diet.

Thus, iodine can be present in the diet compositions of the present invention at a maximum concentration equal to or less than about 2.5 mg/kg of diet, a maximum concentration equal to or less than about 2.0 mg/kg of diet, a maximum concentration equal to or less than about 1.0 mg/kg of diet, a maximum concentration equal to or less than about 0.9 mg/kg of diet, a maximum concentration equal to or less than about 0.8 mg/kg of diet, a maximum concentration equal to or less than about 0.6 mg/kg of diet, a maximum concentration equal to or less than about 0.4 mg/kg of diet, a maximum concentration equal to or less than about 0.35 mg/kg of diet, a maximum concentration equal to or less than about 0.3 mg/kg of diet, a maximum concentration equal to or less than about 0.25 mg/kg of diet, or a maximum concentration of equal to or less than about 0.2 mg/kg diet on a dry matter basis. Minimum amount of iodine or selenium can be an amount to maintain health in the feline.

Intake in an animal of a nutrient from a food, feedstuff, beverage, or supplement can be expressed as the product of the concentration of said nutrient element in said food, feedstuff, beverage, or supplement and the amount of said food, feedstuff, beverage, or supplement ingested by said animal.

Nutrients can be provided to a feline in the form of cat food. A variety of commonly known cat food products are available to cat owners. Commercial cat foods are of three basic types: canned (wet) cat foods, semi-moist cat foods, and dry-type cat foods. Cat treats also are available. Canned cat foods generally have a moisture content above 65%, usually 68% to 85%. Semi-moist cat foods typically has a moisture content between 10-65%, usually 25% to 40%, and may include humectants, potassium sorbate, and other ingredients to stabilize the product and to prevent microbial growth (bacteria and mold). Dry-type cat foods generally have a moisture content of about 10% or less and their processing typically includes extruding, drying and/or baking in heat. Cat treats can typically be semi-moist, chewable treats; dry treats in any number of forms; chewable bones or baked, extruded or stamped treats; confection treats; or other kinds of treats as are known to those skilled in the art.

Nutrients also may be provided to a feline in a form other than prepared cat food. Thus, for example, Kyle et al. added a vitamin-mineral mixture to a canned cat food (Kyle et al., New Zealand Veterinary Journal 42:101-103, 1994). Drinking water or other fluid similarly may be used to provide nutrients to a feline.

Commercial canned cat food products contain varying amounts of iodine and selenium expressed on a dry matter (DM) basis as shown in Tables 1 and 2.

TABLE 1

CANNED CAT FOOD.

| LABEL DESCRIPTION (n = 28) | SELENIUM (mg/kg DM) | IODINE (mg/kg DM) |
|---|---|---|
| SHEBA Gourmet salmon dinner | 0.812 | 1.55 |
| WHISKAS Ground Mealtime | 0.837 | 1.96 |
| WHISKAS Homestyle Chicken & Salmon | 0.863 | 1.18 |
| WHISKAS Ocean Whitefish & Tuna | 1.01 | 2.98 |
| NUTRO Max Cat Chicken & Lamb | 1.28 | 47.87 |
| NUTRO Kitten Chicken & Ocean Fish | 1.34 | 3.24 |
| NUTRO Cat Chicken & Liver Formula | 1.16 | 30.91 |
| FRISKIES Prime Entrée | 1.36 | 4.57 |
| FRISKIES Senior Ocean Whitefish & Rice | 1.78 | 10.59 |
| FANCY FEAST Sliced Beef Feast | 1.50 | 1.30 |
| FANCY FEAST Sardines, Shrimp & Crab | 4.23 | 1.35 |
| FANCY FEAST Ocean Whitefish & Tuna | 2.45 | 5.45 |
| FANCY FEAST Tender Liver & Chicken | 1.84 | 3.08 |
| FANCY FEAST Seafood | 2.09 | 3.27 |
| FANCY FEAST Fish & Shrimp | 3.17 | 1.33 |
| FANCY FEAST Trout | 1.29 | 1.09 |
| FANCY FEAST Tuna & Mackerel | 2.24 | 2.02 |
| HEINZ 9 LIVES Super Supper | 2.38 | 2.47 |
| HEINZ 9 LIVES Ocean Whitefish & Tuna | 1.90 | 5.06 |
| HEINZ 9 LIVES Poached Salmon | 1.60 | 52.27 |
| IAMS Adult Beef Formula | 1.95 | 4.5 |
| IAMS Adult Chicken Formula | 1.32 | 3.18 |
| IAMS Adult Ocean Fish Formula | 2.56 | 5.14 |
| IAMS Adult Salmon Formula | 1.70 | 4.88 |
| BEST CHOICE Ocean Whitefish & Tuna | 1.63 | 2.11 |
| BEST CHOICE Salmon Dinner | 1.66 | 4.38 |
| BEST CHOICE Fisherman's Catch | 2.27 | 4.48 |
| KOZY KITTEN Fish Dinner | 1.32 | 7.07 |
| AVERAGE | 1.77 | 7.83 |

TABLE 2

DRY CAT FOOD.

| LABEL DESCRIPTION (n = 14) | SELENIUM (mg/kg DM) | IODINE (mg/kg DM) |
|---|---|---|
| WHISKAS Original | 0.551 | 1.34 |
| IAMS Kitten Formula | 0.599 | 2.96 |
| IAMS Weight Control Formula | 0.544 | 3.16 |
| IAMS Original Cat Formula | 0.602 | 2.80 |
| EUKANUBA Adult Chicken & Rice | 0.797 | 2.12 |
| PURINA Kitten Chow | 0.973 | 3.05 |
| PURINA Meow Mix Chicken-Turkey-Salmon | 0.636 | 2.39 |
| PURINA Cat Chow Original | 0.729 | 5.94 |
| PURINA O.N.E. Regular | 0.813 | 2.45 |
| NUTRO Max Cat Lite | 0.479 | 3.38 |
| NUTRO Max Cat Chicken-Rice-Lamb | 0.430 | 3.32 |
| FRISKIES Ocean Fish | 0.717 | 1.97 |
| FRISKIES Chef's Blend | 0.720 | 2.17 |
| HEINZ 9 LIVES Tuna & Eggs | 1.01 | 1.79 |
| AVERAGE | 0.69 | 2.77 |

Commercial cat foods generally include ingredients from the following classes: protein from animal and/or plant sources; individual amino acids; fats; carbohydrate sources, vitamins; minerals; and additional functional ingredients such as preservatives, emulsifiers, and the like.

Protein sources for use in cat foods can comprise from 45% to 100% crude protein on a dry matter basis. Twenty-one protein ingredients commonly used in commercial production of cat foods were analyzed for their contents of selenium and iodine. The results were expressed as mg/kg dry matter (DM) and also as mg/kg crude protein (CP), as shown in Table 3 below.

TABLE 3

| Protein Ingredient | Crude Protein (% DM) | Selenium mg/kg DM | Selenium mg/kg CP | Iodine mg/kg DM | Iodine mg/kg CP |
|---|---|---|---|---|---|
| potato concentrate | 75 | 0.08 | 0.11 | 0.084 | 0.11 |
| soy concentrate | 72 | 0.15 | 0.21 | 0.098 | 0.14 |
| soy protein isolate | 91.5 | 0.27 | 0.30 | 0.144 | 0.16 |
| soybean meal | 48.5 | 0.45 | 0.93 | 0.01 | 0.02 |
| corn gluten meal | 64 | 1.25 | 1.95 | 0.02 | 0.03 |
| chicken backs | 75 | 0.41 | 0.55 | 0.02 | 0.03 |
| rice protein isolate | 60 | 0.75 | 1.25 | 0.041 | 0.07 |
| pea protein concentrate | 50 | 1.79 | 3.58 | 0.049 | 0.10 |

TABLE 3-continued

| Protein Ingredient | Crude Protein (% DM) | Selenium mg/kg DM | Selenium mg/kg CP | Iodine mg/kg DM | Iodine mg/kg CP |
|---|---|---|---|---|---|
| wheat protein conc. | 75 | 1.84 | 2.45 | 0.091 | 0.12 |
| wheat protein isolate | 90 | 2.13 | 2.37 | 0.141 | 0.16 |
| pork liver | 72 | 3.11 | 4.32 | 0.15 | 0.21 |
| beef spleen | 66 | 1.22 | 1.85 | 0.24 | 0.36 |
| beef tongue | 63 | 0.77 | 1.22 | 0.28 | 0.44 |
| pork lung lobes | 75 | 1.71 | 2.28 | 0.29 | 0.39 |
| beef lung | 56 | 0.93 | 1.66 | 0.38 | 0.68 |
| meat protein isolate | 98 | 0.77 | 0.79 | 0.575 | 0.59 |
| deboned turkey | 44.5 | 0.31 | 0.70 | 0.69 | 1.55 |
| Mackerel | 67 | 4.15 | 6.19 | 1.03 | 1.54 |
| Oceanfish | 58 | 1.76 | 3.03 | 1.44 | 2.48 |
| poultry by-product meal | 67 | 0.97 | 1.45 | 2.05 | 3.06 |
| Eggs | 50 | 1.28 | 2.56 | 3.1 | 6.20 |

As shown in the table vegetable proteins such as potato concentrate and soy isolate tend to have lower concentrations of both selenium and iodine.

Protein content in the cat food compositions of the present invention can be in an amount of from about 10%, from about 15%, from about 20%, from about 25%, from about 30%, from about 35% up to about 40%, up to about 45%, up to about 50%, up to about 55%, up to about 60%, up to about 70% or greater on a dry matter basis.

Selenium can be present in the protein component at a concentration equal to or less than about 1.0 mg/kg crude protein, a concentration equal to or less than about 0.8 mg/kg crude protein, a concentration equal to or less than about 0.6 mg/kg crude protein, a concentration equal to or less than about 0.5 mg/kg protein, a concentration equal to or less than about 0.4 mg/kg crude protein, a concentration equal to or less than about 0.3 mg/kg crude protein or a concentration equal to or less than about 0.2 mg/kg crude protein.

Iodine can also be present in the protein component at a concentration equal to or less than about 1.0 mg/kg crude protein, a concentration equal to or less than about 0.8 mg/kg crude protein, a concentration equal to or less than about 0.6 mg/kg crude protein, a concentration equal to or less than about 0.4 mg/kg crude protein, a concentration equal to or less than about 0.2 mg/kg crude protein, a concentration equal to or less than about 0.1 mg/kg crude protein, a concentration equal to or less than about 0.05 mg/kg crude protein or a concentration equal to or less than about 0.02 mg/kg crude protein.

The protein can be present from animal sources such as meat or meat by-products or from plant sources such as from vegetable protein sources. Animal protein sources can include meat protein isolate, pork lungs, chicken, pork liver, poultry meal, egg and combinations thereof. Vegetable protein sources can include potato concentrate, soy concentrate, soy protein isolate, soybean meal, corn gluten meal and combinations thereof.

Carbohydrate can be supplied from grain ingredients. Such grain ingredients can comprise vegetable materials, typically farinaceous materials, which can supply primarily, dietary digestible carbohydrate and indigestible carbohydrate (fiber) and less than about 15% protein on a dry matter basis. Examples include without limitation brewers rice, yellow corn, corn flour, soybean mill run, rice bran, cellulose, gums, and the like. Typically, carbohydrate can be present in the compositions of the present invention in amounts of from about 5%, from about 10%, from about 15%, from about 20%, from about 25%, from about 30%, up to about 35%, up to about 40%, up to about 45%, up to about 50%, up to about 55% or greater, on a dry matter basis.

Fats used in cat food include without limitation animal fats and oils, such as choice white grease, chicken fat, and the like; vegetable fats and oils; and fish oils. Fats can be present in the cat food compositions of the present invention in concentrations of from about 5%, from about 10%, from about 15%, up to about 20%, up to about 25% or up to about 30% on a dry matter basis.

The percentage of ingredients for use in a cat food composition to achieve particular percentages of protein, carbohydrate and fat can be determined by methods well known in the art. For example, one can employ known computer programs using linear programming techniques to design pet food diets with specific characteristics. An example of such a program is the VLCFX ("Visual Least Cost Formulation—eXtended") Product Formulation and Management System provided by Agri-Data Systems, Inc., Phoenix, Ariz.

Individual amino acids can also be included as ingredients in cat food when required to supplement the protein ingredients. Such amino acids that can be added to cat food are known in the art.

Vitamins and minerals may can also be included into the cat food compositions of the present invention. Sources of vitamins can include complex natural sources such as brewers yeast, engivita yeast, and the like, and synthetic and purified sources such as choline chloride and the like. Minerals in the cat food compositions of the present invention can include dicalcium phosphate, calcium carbonate, calcium sulfate, potassium chloride, potassium citrate, iodized and non-iodized salt as required to achieve a desired iodine content, and other conventional forms of the mineral nutrients known in the art (see, for example, National Research Council, *Nutrient Requirement of Cats*, Washington, D.C., National Academy of Sciences, page 27, Table 5 footnotes, 1978).

The following examples are further illustrative of the present invention, but it is understood that the invention is not limited thereto.

EXAMPLE 1

This example illustrates the effect of a diet providing a restricted intake of both selenium and iodine on thyroid function in older cats having hyperthyroid disease.

A low selenium, low iodine dry cat food, designated diet 30643, was prepared with the following composition and characteristics: grain ingredients, 50-55%; animal protein, 0-5%; vegetable protein, 30-35%; animal fat, 8-10%; other ingredients, 5-7%; selenium, 0.2 mg/kg on a dry matter basis; and iodine, 0.2 mg/kg on a dry matter basis.

Ten geriatric cats with hyperthyroid disease were allotted into two groups based on age and serum total T4 level. The cats were fed a control dry cat food or diet 30643, with contents of iodine and selenium as shown in Table 4 below.

TABLE 4

| Dry Diet description | Se (mg/kg DM) | I (mg/kg DM) |
|---|---|---|
| Control | 0.6 | 2.5 |
| diet 30643 | 0.2 | 0.2 |

The diets were fed for eight weeks. Food intake was measured daily and body weight was measured weekly. Blood was drawn aseptically every two weeks after overnight removal of food. Blood for complete blood counts and serum for thyroid hormone analyses were analyzed immediately. Blood for other measurements was centrifuged at 5000 g and the serum harvested and frozen and stored at −70° C. until analyzed for serum chemistries and iodine and selenium concentrations.

Serum total T3 and T4 concentrations were measured by radioimmunoassay for use in cats. Serum free T4 concentrations was determined by use of equilibrium dialysis to separate the bound forms from the free forms; radioimmunoassay was used to measure the concentrations of the free forms in the dialysate.

The assay for estimating free T3 in feline serum used an $^{125}$I-triiodothyronine (T3) derivative that does not bind significantly to the natural binding proteins in serum. In addition, a high affinity antibody was used which binds both the derivative and T3. These two T3 compounds allow for a classical equilibrium radioimmunoassay to be performed without interference from binding proteins and bound T3. The assay antibody was bound to the wall of 12×75 mm polypropylene tubes for simple solid phase separation of bound assay fractions from free fractions. The remainder of the assay was standard radioimmunoassay technology.

Serum and dietary iodine were measured by epithermal instrumental neutron activation analysis using a boron nitride irradiation capsule (Spate et al., *J Radioanalytical Nuclear Chem* 195: 21-30, 1995).

The results of this feeding trial are shown below in Table 5.

cats fed the low selenium diet 30643 but were unchanged in the cats fed the control diet. Serum glutathione peroxidase (GPX), an index of selenium nutritional status, was unchanged in the cats fed diet 30643 but increased in the cats fed the control diet. GPX, a selenium-containing enzyme, has important antioxidant functions, so decreased activity of GPX would be undesirable.

EXAMPLE 2

This example illustrates the effect of selenium intake on circulating thyroid hormone levels in kittens.

Thirty-six specific-pathogen-free domestic short-hair kittens (19 males and 17 females; 9.8 weeks old) were utilized in a randomized complete block design with gender and weight used as blocking criteria. The kittens were fed a low selenium (0.02 mg/kg Se, dry matter basis) torula yeast-based diet for 5 weeks (pre-test) after which an amino acid-based diet (0.027 mg Se/kg diet) was fed for 8 weeks (experimental period). Six levels of selenium (0, 0.05, 0.075, 0.10, 0.20 and 0.30 mg/kg diet) were added to the amino acid-based diet in the form of sodium selenite. Further experimental details were as described earlier (Wedekind et al., *J Anim Physiol Anim Nutr (Berl)* 875-230, 2003 which is hereby incorporated in whole by reference).

Food intake was measured daily and body weight weekly. Response variables included selenium concentrations and GPX activity in plasma and red blood cells (RBC) as well as plasma total T3 and total T4. No significant changes in food intake, weight gain or clinical signs of selenium deficiency were noted.

TABLE 5

| ANALYTE | DIET | WEEK 0 | WEEK 8 | CHANGE | STATISTICAL SIGNIFICANCE | NORMAL RANGE |
|---|---|---|---|---|---|---|
| Serum total T4, nmol/L | control | 72.8 | 75.3 | +10 | n.s. | 10-55 |
| | diet 30643 | 74.6 | 47.6 | −27 | P < 0.05 | |
| Serum free T4, pmol/L | control | 24.4 | 22.0 | +1 | n.s. | 10-17 |
| | diet 30643 | 29.6 | 17.6 | −12 | P < 0.05 | |
| Serum total T3, nmol/L | control | 1.58 | 1.58 | +0.10 | n.s. | 0.6-1.4 |
| | diet 30643 | 1.64 | 0.90 | −0.74 | P < 0.05 | |
| Serum free T3, pmol/L | control | 10.52 | 8.18 | −1.60 | n.s. | 1.5-6.0 |
| | diet 30643 | 9.96 | 5.32 | −4.64 | P < 0.05 | |
| Serum iodine, mg/L | control | 0.178 | 0.201 | +0.016 | n.s. | — |
| | diet 30643 | 0.148 | 0.045 | −0.103 | P < 0.05 | — |
| Urine iodine, µg/mg creatinine | control | 1.12 | 0.485 | −0.67 | P < 0.05 | — |
| | diet 30643 | 1.09 | 0.034 | −1.06 | P < 0.05 | — |
| Serum selenium, mg/L | control | 0.53 | 0.51 | 0 | n.s. | — |
| | diet 30643 | 0.50 | 0.38 | −0.12 | P < 0.05 | — |
| Serum GPX, U/mL | Control | 5.01 | 6.11 | 1.31 | P < 0.05 | — |
| | diet 30643 | 4.52 | 4.90 | 0.37 | n.s. | — |

As shown in the table, cats fed diet 30643 showed significant reductions in serum total T3 and T4, to normal levels, whereas the concentrations of these thyroid hormones in cats fed the control diet were unchanged. Free T3 and T4 showed similar statistically significant reductions in the cats fed the diet 30643. Serum selenium and iodine levels decreased in the The kitten's selenium requirement was estimated from breakpoints in the curves regressing RBC and plasma GPX on selenium intake. Breakpoints were determined to be 0.12 and 0.15 mg/kg, dry matter basis, respectively. No definitive breakpoint was observed for the curve regressing plasma selenium concentrations on selenium content of the diet.

Plasma selenium levels continued to increase as selenium intake increased, even above the estimated requirement.

Selenium intake of the kittens affected their thyroid hormone levels. Plasma total T4 and the ratio of total T4: total T3 decreased in a quadratic fashion as the dietary selenium concentration increased. However, plasma total T3 increased linearly as shown in Table 6.

TABLE 6

| DIETARY SELENIUM mg/kg | PLASMA SELENIUM[1] μmol/L | PLASMA TOTAL T4[1] nmol/L | PLASMA TOTAL T3[1] nmol/L | RATIO, T4:T3 |
|---|---|---|---|---|
| 0.027 | 0.22$^a$ | 41.9$^c$ | 0.73$^a$ | 57.4 |
| 0.073 | 0.99$^b$ | 29.3$^{ab}$ | 0.86$^a$ | 34.1 |
| 0.100 | 1.56$^c$ | 32.6$^b$ | 0.92$^a$ | 35.4 |
| 0.122 | 2.06$^d$ | 30.7$^{ab}$ | 0.91$^a$ | 33.7 |
| 0.210 | 4.12$^e$ | 24.0$^a$ | 0.91$^{ab}$ | 26.4 |
| 0.314 | 4.61$^f$ | 28.4$^{ab}$ | 1.27$^b$ | 22.4 |

[1]Mean values not bearing the same superscript letter differ significantly (P < 0.05)

The regression of total T3 (Y) on supplemental selenium concentration from sodium selenite (X) was Y=0.79 (±0.08)+ 1.42 (±0.51)X, $R^2$=0.19. The regression of total T3 on plasma selenium was Y=0.79 (±0.09)+0.081 (±0.03)X, $R^2$=0.17, p<0.05.

The observations that the plasma selenium concentration and that plasma T3 levels continued to increase at selenium intake levels above the requirement indicate that controlling the selenium intake of the growing cat is important for maintaining normal thyroid function.

EXAMPLE 3

This example illustrates the effect of increasing dietary selenium on indicators of thyroid function in normal healthy adult cats.

A low selenium diet was prepared with the following ingredients: water, dried torula yeast, chicken fat, cornstarch, cellulose, and a selenium-free mixture of minerals, vitamins and L-cystine, DL-methionine, L-tryptophan, and choline chloride. The mineral mixture contained calcium carbonate, sodium chloride, ferrous sulfate heptahydrate, zinc sulfate monohydrate, manganese sulfate monohydrate, copper sulfate pentahydrate, boric acid, sodium molybdate dihydrate, potassium iodide, and cobalt sulfate heptahydrate. The vitamin mixture contained Vitamin A (as retinyl acetate), vitamin E (as dl-alpha-tocopheryl acetate), niacin, thiamin, D-pantothenic acid, pyridoxine hydrochloride, riboflavin, folic acid, biotin, and cyanocobalamin. The diet contained by analysis 8.8% crude protein (as is basis) and 0.04 mg of selenium per kg of diet on a dry matter basis.

Sixty normal healthy adult cats were fed this low selenium diet (0.03 mg/kg dry matter basis) for 3 weeks. After this depletion period, the cats were allotted to groups of ten cats each and fed the same diet supplemented with 6 levels of selenomethionine (0, 0. 1, 1, 2.5, 5 and 10 mg/kg, dry matter basis, as elemental selenium) for 6 months. Thirty-three cats completed the study.

Response variables measured included selenium concentration and GPX activity in serum and red blood cells, complete thyroid hormone profile, complete blood count (CBC), serum chemistry profile (SCP), hair growth rate and immune function measures. No significant changes in body weight, CBC, SCP or clinical signs were observed after six months of feeding.

A definitive breakpoint in the curve regressing serum GPX on dietary selenium intake indicated a minimum recommendation of 0.13 ppm. Overall results indicate that the minimum requirement for selenium is 0.13 mg/kg dry matter basis in adult cat foods. Hair growth rate was significantly decreased at selenium concentrations below the breakpoint, but was unchanged at high selenium concentrations.

All total thyroid hormone serum concentrations were within normal ranges. Serum selenium concentrations in these cats did not plateau at selenium intakes greater than the cat's requirement for selenium, but continued to increase linearly. The serum thyroid hormone and selenium levels with increasing dietary selenium are shown in Table 7.

TABLE 7

| DIETARY SELENIUM | NUMBER OF CATS | TOTAL T4 (nmol/L) | TOTAL T3 (nmol/L) | FREE T3 (pmol/L) | SELENIUM (mg/L) |
|---|---|---|---|---|---|
| 0.03 mg/kg | 4 | 41.5 | 0.475 | 4.22 | 0.056 |
| 0.13 mg/kg | 6 | 37.0 | 0.717 | 4.87 | 0.409 |
| 1.0 mg/kg | 7 | 39.6 | 0.714 | 5.37 | 0.562 |
| 2.5 mg/kg | 7 | 38.3 | 0.671 | 5.17 | 0.673 |
| 5.0 mg/kg | 4 | 30.8 | 0.625 | 4.02 | 0.884 |
| 10.0 mg/kg | 5 | 39.2 | 0.720 | 5.82 | 1.099 |
| Normal values | | 10-55 | 0.6-1.4 | 1.5-6.0 | — |

The dietary selenium intake level was significantly correlated with total T3 levels (Y): Y=0.977+0.12157X, where X is selenium intake (r=0.36; P=0.0343). Serum selenium levels also were significantly correlated with total T3 levels (Y): Y=0.562+0.01336X, where X equals selenium intake (r=0.395; P=0.0227).

All references cited in this specification are hereby incorporated by reference. Any discussion of references cited herein is intended merely to summarize the assertions made by their authors and no admission is made that any reference or portion thereof constitutes relevant prior art. Applicants reserve the right to challenge the accuracy and pertinence of the cited references.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for treating or reducing risk of developing hyperthyroidism by reducing the serum levels of thyroid hormone T3 and/or T4, the method comprising administering to a feline in need thereof a diet wherein the amount of selenium in the feline diet is equal to 0.2 mg/kg but not more than 0.8 mg/kg and the amount of iodine in the feline diet is equal to 0.2 mg/kg but not more than 1.0 mg/kg, on a dry matter basis.

2. A method according to claim 1, wherein the diet comprises protein at a concentration of from about 10% to about 50% on a dry matter basis.

3. A method according to claim 2, wherein the diet comprises protein at a concentration of from about 20% to 40% on a dry matter basis.

4. A method according to claim 2, wherein the protein is derived from a protein source that comprises selenium at a concentration of not more than 1.0 mg/kg crude protein.

5. A method according to claim 4, wherein the protein is derived from a protein source that comprises selenium at a concentration of not more than 0.5 mg/kg crude protein.

6. A method according to claim 2, wherein the diet further comprises fat at a concentration of from 10 to 30% on a dry matter basis and carbohydrate at a concentration of from 5% to 55% on a dry matter basis.

7. A method according to claim 2, wherein the protein comprises a vegetable protein.

8. A method according to claim 7, wherein the vegetable protein is selected from the group consisting of potato concentrate, soy concentrate, soy protein isolate, soybean meal, rice protein isolate, corn gluten meal and combinations thereof.

9. A method according to claim 2, wherein the protein comprises an animal protein.

10. A method according to claim 9, wherein the animal protein is selected from the group consisting of chicken backs, beef tongue, pork lung, beef lung, mechanically deboned turkey, poultry by-product meal, egg and combinations thereof.

\* \* \* \* \*